United States Patent

Green et al.

Patent Number: 5,500,149
Date of Patent: Mar. 19, 1996

[54] PROCESSES FOR THE CONVERSION OF METHANE TO SYNTHESIS GAS

[75] Inventors: Malcolm L. Green, Oxford, Great Britain; Anthony K. Cheetham, Montecito, Calif.; Patrick D. Vernon, Oxford; Alexander T. Ashcroft, Lancashire, bot of, Great Britain

[73] Assignee: British Gas plc, United Kingdom

[21] Appl. No.: 427,586

[22] Filed: Apr. 24, 1995

Related U.S. Application Data

[62] Division of Ser. No. 81,289, Aug. 20, 1993, Pat. No. 5,431,855.

[30] Foreign Application Priority Data

Dec. 24, 1990 [GB] United Kingdom ............ 9028034

[51] Int. Cl.$^6$ ........................................ C07C 1/02
[52] U.S. Cl. ........................................ 252/373
[58] Field of Search ................................ 252/373

[56] References Cited

U.S. PATENT DOCUMENTS

| 4,833,170 | 5/1989 | Agee ........................ 252/373 |
| 5,023,276 | 6/1991 | Yarrington et al. ............ 252/373 |
| 5,431,855 | 7/1995 | Green et al. ................ 252/373 |

FOREIGN PATENT DOCUMENTS

| 0084273 | 7/1983 | European Pat. Off. . |
| 2239406 | 7/1991 | United Kingdom . |

OTHER PUBLICATIONS

*Nitrogen*, No. 187, pp. 28–29 (Sep.–Oct. 1990).

*Primary Examiner*—Werren B. Lone
*Attorney, Agent, or Firm*—Wenderoth Lind & Ponack

[57] ABSTRACT

A method of converting a reactant gas mixture of $CO_2$, $O_2$ and $CH_4$ comprises contacting the reactant gas at 750°–850° C. with a solid catalyst, which is a d-block transition metal or oxide such as a group VIII metal on a metal oxide support such as alumina, and which selectively converts the reactant gas into a product gas mixture comprising $H_2$ and CO.

1 Claim, No Drawings

PROCESSES FOR THE CONVERSION OF METHANE TO SYNTHESIS GAS

This is a divisional application of Ser. No. 08/081,289, filed Aug. 20, 1993 now U.S. Pat. No. 5,431,855.

The major commercial process for the utilization of methane (steam reforming) involves a nickel catalysed reaction of methane with steam.

$$CH_4 + H_2O \rightleftharpoons CO + 3H_2$$

The products of this reaction are four gases which under catalytic conditions are in the equilibrium known as the water-gas shift reaction, namely $$CO + H_2O \rightleftharpoons CO_2 + H_2$$

The equilibrium concentrations depend on the temperature and pressure at which the catalytic reaction is carried out.

The two gases, carbon monoxide and hydrogen, can be combined under catalytic conditions to give useful chemicals such as methanol or, via Fischer-Tropsch catalysis, higher hydrocarbons or aldehydes and alcohols. In consequence, the steam reforming process is an important industrial source of carbon monoxide and hydrogen, but the technology of steam conversion requires considerable capital investment, and is relatively inefficient since water and carbon dioxide are unwanted by-products of the reaction.

Therefore there is considerable industrial interest in the combined reforming-partial oxidation of methane to give carbon monoxide and hydrogen as the substantially major products.

British Patent Application No. 9018781.6 describes the catalysts for the partial oxidation of methane by oxygen to synthesis gas under relatively mild conditions of 650°–900° C. and pressures of 10–600 KPa without the use of steam. The catalysts include d-block transition metals on a refractory support and d-block transition metal oxides including mixed metal oxides.

Thus, this invention is concerned with essentially two processes. Process 1 is the reaction of $CO_2$ with methane giving synthesis gas according to Equation 6. Process 2 is the reaction of oxygen and carbon dioxide mixtures with methane also giving synthesis gas.

$$(a)CO_2 + (b)O_2 + (c)CH_4 \rightarrow (x)CO + (y)H_2$$

A potential application of reaction 6, which is endothermic, is to use energy such as solar energy to drive the reaction to form the synthesis gas, which could then be stored and transported. The reverse reaction, namely the reduction of CO to methane, for which there are well-known catalysts, is highly exothermic thus heat stored by the first reaction can be released by the reverse methanation.

Another aspect of the invention concerns the potential application for usage of $CO_2$, which has environmental implications towards the general problem of the greenhouse effect.

This invention is concerned with the definition of the conditions and catalysts which will give rise to the conversion of the methane and $CO_2$, $O_2$ to synthesis gas with greatly improved selectivity and conversions. Accordingly, the present invention provides a method of converting primary reactant gas mixture comprising $CO_2$, $O_2$ and $CH_4$ into a product gas mixture comprising $H_2$ and CO which method comprises bringing primary reactant gas mixture at a temperature of from 600°–1000° C. into contact with a solid catalyst of the following formula:

$M_xM'_yO_z$ or $M_xO_z$ or $M'_yO_z$ or M' on a suitable support where M is at least one metal selected from Li, Na, K, Rb, Cs, Be, Mg, Ca, Sr, Ba, B, Al, Sc, Y, Ln, Ga, In, Tl, Bi, U, Th and Pb.

Ln is selected from La, Ce, Pr, Nd, Sm, Eu, Gd, Tb, Dy, Ho, Er, Tm, Yb, Lu and Y. M' is at least one metal selected from Ti, V, Cr, Mn, Fe, Co, Ni, Cu, Zn, Ga, Ge, Y, Zr, Nb, Mo, Ru, Rh, Pd, Ag, Cd, In, Sn, Hf, Ta, W, Re, Os, Ir, Pt, Au, Hg, Tl, Pb, Bi, Th and U.

Each of the ratios x/z and y/z and (x+y)/z is independently from 0.1 to 8, preferably from 0.5 to 0.75. The method is characterized in that $CO_2$ is a feedstock to the primary gas mixture.

Alternatively, the metal oxide systems may be catalyst precursors, from which the active catalyst is formed by heating under non-oxidizing conditions. For example, the catalyst precursor may decompose to yield the metal on the oxide support.

All the metal oxide systems may be crystalline, monophasic or polyphasic, they may be amorphous, they may be stoichiometric or non-stoichiometric; they may have defect structures. They may be solid solutions. The values of x, y and z may be integral or non-integral. In the mixed metal oxides, the ratio of x to y is not critical and may for example be from 0.001 to 1000.

Catalyst preparation is normally straightforward: the metal oxides, or precursors thereof such as carbonates or nitrates or any thermally decomposable salts, can be precipitated onto a refractory solid which may itself be massive or particulate. Or one metal oxide or precursor may be precipitated onto the other.

Preferred catalyst precursors are those having M' highly dispersed on an inert metal oxide support and in a form readily reducible to the elemental state.

The combined partial pressures of the reactant gases should preferably lie in the range 0.01 MPa–10 MPa, preferably at 0.1 MPa.

The reaction 6 is endothermic, H=+247 kJ and it is required to heat the reactant gases at temperatures in the range 600°–1000° C. The ratio of $CO_2$ to methane may vary from 0.1–10. A preferred temperature range is from 750° to 850° C.

One advantage of using as a feed-stock gas a mixture of $CO_2$, $O_2$ and methane is to obtain an effectively thermal neutral reaction, and this can be achieved when the ratio of $CO_2$ to $O_2$ is approximately 1:6. Many natural sources of methane contain carbon dioxide.

The mole ratio of the reactant gases $CO_2$ and $O_2$ to $CH_4$ should be: $CO_2$ (a): $O_2$ (b): $CH_4$ (c=2b+a), at ideal stoichiometry.

In a further aspect of the invention the reaction is carried out with an excess of $CO_2$ such that the ratio of a/c−2b >1. Under these conditions of excess $CO_2$, the reaction $2CO \rightarrow C + CO_2$ is suppressed; this allows the use of cheaper catalysts such as nickel. This is demonstrated in the data in Experiment 15 using a nickel catalyst. The excess $CO_2$ is largely converted (by the hydrogen generated) to CO by the reverse water gas shift reaction $$CO_2 + H_2 \rightarrow CO + H_2O$$

This gives excellent overall CO yields.

The reaction vessel containing the catalytic reaction should be made of an inert material for example inert oxides, such as quartz ($SiO_2$) or alumina, and containers such as steel are ineffective if they cause deposition of carbon.

We presently believe that the catalysts serve to achieve essentially thermodynamic equilibrium between all possible products according to the following equations:

$CH_4 + 2O_2 \rightleftharpoons CO_2 + 2H_2O$ $CH_4 + H_2O \rightleftharpoons CO + 3H_2$ $CH_4 + CO_2 \rightleftharpoons 2CO + H_2$ The selectivity shown towards the major and desired products, namely CO and $H_2$ reflect the thermodynamic equilibrium under the prevailing conditions. Computer simulations, based on minimizing the total free energy of all possible product combinations excluding carbon, (limited by stoichiometry, of course) predict very similar results to those we obtain, and we are thus confident that thermodynamic equilibrium is attained under our reaction conditions.

The present invention is further illustrated by the following examples in which the reaction 6, $CO_2 + CH_4 \rightarrow 2CO + 2H_2$, has been catalysed by a number of catalysts, as indicated in the data in experiments 1–8.

Experiments 1–6 show that man different transition metals can act as catalysts.

Experiments 1, 7, 8 show how the reaction conditions affect the products.

All the experiments were carried out using 50 mg of solid, powdered catalyst, lightly packed between <20 mg of silica wool (MULTILAB) in a straight silica reaction tube of i.d. ca. 4 mm. The reaction tube (300 mm) was placed in the vertical tube furnace of a LABCON microreactor and connected to a supply of the gas reaction mixture. The reactant gases, methane (supplied by Union Carbide, Gas and Equipment Ltd.), carbon dioxide (supplied by British Oxygen Company), dioxygen (supplied by Air Products) and dinitrogen (supplied by Air Products) were dried over molecular sieves and passed over the catalyst at a rate of 1–50 ml/min (GHSV of $0.12–7 \times 10^4$ hour$^{-1}$). The temperature of the reaction tube was raised from ambient to the required temperature (typically 1050K, unless otherwise stated) over a period of 2 hours. The reaction products were monitored using an on-line Hewlett-Packard 5890A gas chromatography apparatus. Separation of all gases was obtained using Helium carrier gas through Porapak Q and 5A molecular sieve packed columns, and were detected using a Thermal Conductivity Detector, calibrated on site. In all cases $O_2$ conversion was >99.5%, and C, H, N mass balances were better than 96%.

Particulars for the catalytic reduction of $CO_2$ by $CH_4$. Mixtures of methane and carbon dioxide were passed over heterogeneous catalyst systems which were selected in the light of our previous experience with catalysts for the partial oxidation of methane. The conditions of the experiments and the products of the reactions are given in the Tables 1–8. These show that several of the catalysts under study are highly effective for the conversion of methane to synthesis gas operating under mild conditions of pressure, at 1050K, and with large gas hourly space velocities.

Particulars for the catalytic conversion of mixtures of $CO_2$, $O_2$ and $CH_4$ to synthesis gas.

Mixtures of $CO_2$, $O_2$ (or air) and $CH_4$ have been passed over selected heterogeneous catalysts. The conditions and products of the reactions are given in Tables 9–15. The data show that several of the catalysts studied are highly efficient for the conversion to synthesis gas. Extended catalyst lifetime studies are in progress but, as indicated in Table 1 most catalysts should be expected to show no deterioration in activity after 80 hours, and possibly much longer.

EXPERIMENT 1

Results obtained over 50 mg 1% Ir/$Al_2O_3$, GHSV=$2 \times 10^4$ hour$^{-1}$, 1050K, 0.1 MPa.

Catalyst prepared via an incipient wetness technique from $IrCl_3$, subsequently reduced under flowing hydrogen at 800° C. for 24 hours.

| $CO_2/CH_4$ | % $CH_4$ converted | % $CO_2$ converted | % yield $H_2$ | % yield CO |
|---|---|---|---|---|
| 3.84 | 100 | 41 | 70 | 54 |
| 2.96 | 99 | 50 | 76 | 62 |
| 1.99 | 97 | 62 | 83 | 74 |
| 1.00 | 88 | 91 | 87 | 89* |
| 0.60 | 58 | 96 | 57 | 71 |
| 0.49 | 47 | 98 | 47 | 64 |
| 0.35 | 34 | 100 | 34 | 51 |

*This experiment ran for 80 hours with no observed loss of activity or selectivity.

EXPERIMENT 2

Results obtained over 50 mg 1% Rh/$Al_2O_3$, GHSV=$1.7 \times 10^4$ hour$^{-1}$, 1050K, 0.1 MPa.

Catalyst prepared via an incipient wetness technique from $RhCl_3$, subsequently reduced under flowing hydrogen at 800° C. for 24 hours.

| $CO_2/CH_4$ | % $CH_4$ converted | % $CO_2$ converted | % yield $H_2$ | % yield CO |
|---|---|---|---|---|
| 1.10 | 88 | 86 | 87 | 88 |
| 1.00 | 86 | 88 | 85 | 87 |

EXPERIMENT 3

Results obtained over 50 mg 1% Ru/$Al_2O_3$, GHSV=$1.9 \times 10^4$ hour$^{-1}$, 1050K, 0.1 MPa.

Catalyst prepared via an incipient wetness technique from an organometallic $CpRu(PMe)_3(B_4H_9)$, subsequently reduced under flowing hydrogen at 800° C. for 24 hours.

| $CO_2/CH_4$ | % $CH_4$ converted | % $CO_2$ converted | % yield $H_2$ | % yield CO |
|---|---|---|---|---|
| 1.05 | 67 | 71 | 62 | 69 |
| 0.92 | 58 | 73 | 53 | 65 |

EXPERIMENT 4

Results obtained over 50 mg 1% Pd/$Al_2O_3$, GHSV=$1.9 \times 10^4$ hour$^{-1}$, 1050K, 0.1MPa.

Catalyst prepared via an incipient wetness technique from $PdCl_2$, subsequently reduced under flowing hydrogen at 800° C. for 24 hours.

| $CO_2/CH_4$ | % $CH_4$ converted | % $CO_2$ Converted | % yield $H_2$ | % yield CO |
|---|---|---|---|---|
| 0.95 | 70 | 77 | 69 | 74 |
| 0.98 | 71 | 75 | 69 | 73 |

EXPERIMENT 5

Results obtained over 50 mg Ni/$Al_2O_3$, GHSV=$2 \times 10^4$ hour$^{-1}$, 1050K, 0.1 MPa.

Catalyst ex-British Gas Plc., CRG 'F', ⅛" pellets, lightly crushed before use in the microreactor.

| $CO_2/CH_4$ | % $CH_4$ converted | % $CO_2$ converted | % yield $H_2$ | % yield CO |
|---|---|---|---|---|
| 0.98 | 88 | 81 | 88 | 85 |

EXPERIMENT 6

Results obtained over 50 mg 1% $Pt/Al_2O_3$, GHSV=$2\times10^4$ hour$^{-1}$, 1050K, 0.1 MPa.

Catalyst prepared via an incipient wetness technique from $PtCl_2$, subsequently reduced under flowing hydrogen at 800° C. for 24 hours.

| $CO_2/CH_4$ | % $CH_4$ converted | % $CO_2$ converted | % yield $H_2$ | % yield CO |
|---|---|---|---|---|
| 0.81 | 22.3 | 41.3 | 16.9 | 30.8 |
| 0.95 | 23.8 | 42.6 | 15.6 | 33.0 |
| At GHSV $5 \times 10^3$ hour$^{-1}$ | | | | |
| 0.97 | 71.9 | 84.6 | 66.9 | 78.2 |

Catalysts 1% $Pd/Al_2O_3$ and $Ni/Al_2O_3$ formed large amounts of carbon, gradually losing their activity and becoming totally clogged up with coke within a few hours.

EXPERIMENT 7

Results obtained over 50 mg 1% $Ir/Al_2O_3$, GHSV=$2\times10^4$ hour$^{-1}$, $CO_2/CH_4$=1.00, 0.1 MPa.

| Temp K. | % $CH_4$ converted | % $CO_2$ converted | % yield $H_2$ | % yield CO |
|---|---|---|---|---|
| 900 | 20 | 30 | 14 | 26 |
| 950 | 34 | 44 | 28 | 40 |
| 1000 | 59 | 68 | 54 | 64 |
| 1050 | 88 | 91 | 87 | 89 |

EXPERIMENT 8

Results obtained over 50 mg 1% $Rh/Al_2O_3$, 1050K, $CO_2/CH_4$=1.00, 0.1 MPa.

| GHSV hour$^{-1}$ | % $CH_4$ converted | % $CO_2$ converted | % yield $H_2$ | % yield CO |
|---|---|---|---|---|
| $5 \times 10^3$ | 88 | 91 | 87 | 89 |
| $1 \times 10^4$ | 88 | 91 | 87 | 89 |
| $1.7 \times 10^4$ | 86 | 88 | 85 | 87 |
| $2.4 \times 10^4$ | 85 | 87 | 83 | 86 |
| $5.6 \times 10^4$ | 68 | 74 | 68 | 71 |

EXPERIMENT 9

Results obtained passing $CH_4/CO_2/O_2$ mixtures over 50 mg 1% $Ir/Al_2O_3$, GHSV=$2\times10^4$ hour$^{-1}$, 1050K, 0.1 MPa. $O_2$ conversions$\geq$99.7%

| Feed Composition | | | | | | |
|---|---|---|---|---|---|---|
| % $CH_4$ | % $CO_2$ | % $O_2$ | % $CH_4$ converted | % $CO_2$ converted | % yield $H_2$ | % yield CO |
| 64.4 | 3.5 | 32.1 | 92 | 9 | 89 | 86 |
| 59.4 | 20.0 | 20.6 | 87 | 83 | 81 | 86 |
| 58.3 | 23.7 | 18.0 | 84 | 83 | 81 | 84 |
| 58.0 | 28.0 | 14.0 | 83 | 90 | 79 | 85 |
| 49.8 | 48.8 | 1.4 | 91 | 87 | 91 | 89 |

EXPERIMENT 10

Results obtained passing $CH_4/CO_2/O_2$ mixtures over 50 mg 1% $Pd/Al_2O_3$, GHSV=$2\times10^4$ hour$^{-1}$, 1050K, 0.1 MPa. $O_2$ conversions$\geq$99.7%

| Feed Composition | | | | | | |
|---|---|---|---|---|---|---|
| % $CH_4$ | % $CO_2$ | % $O_2$ | % $CH_4$ converted | % $CO_2$ converted | % yield $H_2$ | % yield CO |
| 58.1 | 28.5 | 13.4 | 60 | 56 | 53 | 59 |

EXPERIMENT 11

Results obtained passing $CH_4/CO_2/O_2$ mixtures over 50 mg 1% $Ru/Al_2O_3$, GHSV=$2\times10^4$ hour$^{-1}$, 1050K, 0.1 MPa. $O_2$ conversions$\geq$99.7%

| Feed Composition | | | | | | |
|---|---|---|---|---|---|---|
| % $CH_4$ | % $CO_2$ | % $O_2$ | % $CH_4$ converted | % $CO_2$ converted | % yield $H_2$ | % yield CO |
| 57.3 | 29.5 | 13.2 | 70 | 74 | 63 | 71 |
| 56.8 | 29.3 | 14.0 | 72 | 73 | 64 | 72 |

EXPERIMENT 12

Results obtained passing $CH_4/CO_2O_2$ mixtures over 50 mg 1% $Rh/Al_2O_3$, GHSV=$2\times10^4$ hour$^{-1}$, 1050K, 0.1 MPa. $O_2$ conversions$\geq$99.7%

| Feed Composition | | | | | | |
|---|---|---|---|---|---|---|
| % $CH_4$ | % $CO_2$ | % $O_2$ | % $CH_4$ converted | % $CO_2$ converted | % yield $H_2$ | % yield CO |
| 56.5 | 29.0 | 14.5 | 85 | 88 | 79 | 86 |
| 57.2 | 29.5 | 13.3 | 82 | 89 | 77 | 85* |
| 56.2 | 28.5 | 15.3 | 88 | 90 | 83 | 89** |

*GHSV = $4 \times 10^4$ hour$^{-1}$
**GHSV = $1.5 \times 10^4$ hour$^{-1}$

EXPERIMENT 13

Results obtained passing $CH_4/CO_2/O_2$ mixtures over 50 mg $Ni/Al_2O_3$(CRG'F'), GHSV=$2\times10^4$ hour$^{-1}$, 1050K, 0.1 MPa. $O_2$ conversions$\geq$99.7%

| Feed Composition | | | | | | |
|---|---|---|---|---|---|---|
| % $CH_4$ | % $CO_2$ | % $O_2$ | % $CH_4$ converted | % $CO_2$ converted | % yield $H_2$ | % yield CO |
| 56.7 | 28.1 | 15.0 | 89 | 83 | 87 | 87 |

-continued

| Feed Composition | | | | | | |
|---|---|---|---|---|---|---|
| % $CH_4$ | % $CO_2$ | % $O_2$ | % $CH_4$ converted | % $CO_2$ converted | % yield $H_2$ | % yield CO |
| 56.4 | 29.2 | 14.4 | 85 | 87 | 79 | 85 |

EXPERIMENT 14

Results obtained passing $CH_4/CO_2/O_2$ mixtures over 50 mg 1% $Pt/Al_2O_3$, GHSV=$2\times10^4$ hour$^{-1}$, 1050K, 0.1 MPa. $O_2$ conversions$\geq$99.7%

| Feed Composition | | | | | | |
|---|---|---|---|---|---|---|
| % $CH_4$ | % $CO_2$ | % $O_2$ | % $CH_4$ converted | % $CO_2$ converted | % yield $H_2$ | % yield CO |
| 58.2 | 27.9 | 13.9 | 37.5 | 28.0 | 25.7 | 34.5 |

EXPERIMENT 15

Results obtained passing $CH_4/CO_2/O_2$ mixtures over 50 mg $Ni/Al_2O_3$(CRG'F'), $O_2$ conversions$\geq$99.7%

| Feed Composition | | | | | | |
|---|---|---|---|---|---|---|
| % $CH_4$ | % $CO_2$ | % $O_2$ | % $CH_4$ converted | % $CO_2$ converted | % yield $H_2$ | % yield CO |
| 15.0 | 74.7 | 10.3 | 99.8 | 19.2 | 33.4 | 32.7 |
| 17.2 | 72.0 | 10.8 | 100.0 | 23.4 | 25.9 | 38.2 |
| 25.0 | 65.8 | 9.2 | 99.2 | 40.9 | 58.3 | 57.0 |
| 34.0 | 58.1 | 7.9 | 97.0 | 56.3 | 74.1 | 52.4 |
| 33.0 | 58.3 | 8.7 | 98.0 | 53.3 | 73.7 | 69.4 |

REFERENCES

1. All data taken from "Handbook of Chemistry and Physics" 61st ed. (CRC Press, 1980–1981).

2. J. T. Richardson and S. A. Paripatyader, Appl. Catal., 1990, 61, 293.

We claim:

1. A method of converting a reactant gas mixture comprising $CO_2$, $O_2$ and $CH_4$ into a product gas mixture comprising $H_2$ and CO which method comprises bringing the reactant gas mixture at a temperature of from 600°–1000° C. into contact with a solid catalyst of the following formula:

$M_xM'_yO_z$ or $M_xO_z$ or $M'_yO_z$ or

M' on a refractory support where M is at least one metal selected from the group consisting of Li, Na, K, Rb, Cs, Be, Mg, Ca, Sr, Ba, B, Al, Sc, Y, Ln, Ga, In, Tl, Bi, U, Th and Pb, Ln is selected from the group consisting of La, Ce, Pr, Nd, Sm, Eu, Gd, Tb, Dy, Ho, Er, Tm, Yb, Lu and Y, M' is at least one metal selected from the group consisting of Ti, V, Cr, Mn, Fe, Co, Ni, Cu, Zn, Ga, Ge, Y, Zr, Nb, Mo, Ru, Rh, Pd, Ag, Cd, In, Sn, Hf, Ta, W, Re, Os, Ir, Pt, Au, Hg, Tl, Pb, Bi, Th, and U, each of the ratios x/z and y/z and (x+y)/z being independently from 0.1 to 8, and wherein $CO_2$, $O_2$ and $CH_4$ are all present in the feedstock gas mixture and the conversion is performed over a single catalyst bed.

* * * * *